US007256397B2

(12) United States Patent
Kawato et al.

(10) Patent No.: US 7,256,397 B2
(45) Date of Patent: Aug. 14, 2007

(54) MASS ANALYZER AND MASS ANALYZING METHOD

(75) Inventors: Eizo Kawato, Kyoto-fu (JP); Shinichi Yamaguchi, Kyoto-fu (JP)

(73) Assignee: Shimadzu Corporation, Kyoto (JP)

( * ) Notice: Subject to any disclaimer, the term of this patent is extended or adjusted under 35 U.S.C. 154(b) by 658 days.

(21) Appl. No.: 10/740,750

(22) Filed: Dec. 22, 2003

(65) Prior Publication Data

US 2004/0132083 A1 Jul. 8, 2004

(30) Foreign Application Priority Data

Jan. 7, 2003 (JP) ............................ 2003-001003

(51) Int. Cl.
*H01J 49/40* (2006.01)
*B01D 59/44* (2006.01)

(52) U.S. Cl. ...................... 250/292; 250/281; 250/282; 250/287

(58) Field of Classification Search ..................... None
See application file for complete search history.

(56) References Cited

U.S. PATENT DOCUMENTS 6,483,109 B1 * 11/2002 Reinhold et al. ........... 250/292
2005/0127291 A1 * 6/2005 Kawato ...................... 250/288

FOREIGN PATENT DOCUMENTS

JP 2002-502095 A 8/1999
JP 2002-533881 A 10/2002
WO WO 99/39368 A1 8/1999
WO WO 00/38312 A1 6/2000

OTHER PUBLICATIONS

March, R. E. et al., "*Quadrupole Storage Mass Spectrometry*", John Wiley & Sons, Inc., pp. 31-110 (Mar. 1989).

* cited by examiner

*Primary Examiner*—Nikita Wells
(74) *Attorney, Agent, or Firm*—Westerman, Hattori, Daniels & Adrian, LLP.

(57) ABSTRACT

A mass analyzer includes: an ion trap device including an ion trapping space surrounded by a plurality of electrodes; a time-of-flight mass analyzer for determining a mass to charge ratio of ions ejected from the ion trapping space; a trapping voltage generator for generating an ion trapping RF voltage to at least one of the plurality of electrodes; an ejecting voltage generator for generating an ejecting voltage to at least one of the plurality of electrodes to form an ion ejection electric field for ejecting ions trapped in the ion trapping space; and a controller for stopping the ion trapping RF voltage at a timing when ions are trapped in the ion trapping space and the ion trapping RF voltage is at a predetermined phase, and for applying the ion ejecting voltage a predetermined period after the ion trapping RF voltage is stopped. Here the predetermined phase and the predetermined period are predetermined so that, when the ion trapping RF voltage is stopped at the predetermined phase and the predetermined period passes, the voltage of said at least one of the electrodes to which the ion trapping voltage is generated becomes almost a certain fixed value irrespective of the amplitude of the ion trapping RF voltage when it is stopped. Thus, by stopping the ion trapping RF voltage and applying the ion ejecting voltage at such a timing, the initial kinetic energy of the ejected ions does not vary with the amplitude of the ion trapping voltage before it is stopped, and a precise determination of the mass to charge ratio of the ions becomes possible.

10 Claims, 3 Drawing Sheets

MASS ANALYZER AND MASS ANALYZING METHOD

The present invention relates to an ion trap device in which ions are trapped with a three-dimensional quadrupole electric field, and an ion trapping method in the ion trap device. Such an ion trap device, which may also be called simply an "ion trap", is used in mass spectrometers, for the ion source of time-of-flight mass spectrometers (TOF-MS), and for other ion analyzers.

BACKGROUND OF THE INVENTION

In a TOF-MS, accelerated ions are injected into a flight space where no electric field or no magnetic field is present, and the ions are separated by their mass to charge ratios with the flight time of the ions in the flight space. For the ion source of a TOF-MS, an ion trap device is used in many cases.

As shown in FIG. 4, a typical ion trap device 1 is composed of a ring electrode 11, and a pair of end cap electrodes 12, 13 placed opposing each other with the ring electrode 11 between them. Usually, an RF (radio frequency) voltage is applied to the ring electrode 11 to form a quadrupole electric field in the ion trapping space 14 surrounded by the electrodes 11, 12, 13, whereby ions are trapped within the ion trapping space 14. In one case, ions are generated outside of the ion trap device 1 and introduced into it, and in another case they are generated within the ion trap device 1. The theory of such an ion trapping method is described in detail in, for example, "Quadrupole Storage Mass Spectrometry" by R. E. March and R. J. Hughes, John Wiley & Sons, 1989, pp. 31–110.

A wide variety of samples are analyzed by such mass analyzers, and the range of mass to charge ratio to be analyzed depends on the sample. In an ion trap device, ions are not only trapped and stored in the ion trapping space, but also manipulated in various processes such as cooling their vibrational motion, selection of ions with specific mass to charge ratio and excited for collisional dissociation to perform structural analysis of the sample. The amplitude of the RF voltage is controlled so that the trapping potential appropriate for each process is established.

When ions are to be analyzed in the TOF-MS, the RF voltage applied to the ring electrode 11 is stopped after various processings as mentioned above are done and object ions are prepared in the ion trapping space 14. Then an ejecting voltage is applied to the end cap electrodes 12, 13 to form an ion ejection electric field in the ion trap device. Owing to the ion ejection electric field, ions are accelerated and ejected through a hole 13*a* in an end cap electrode to the TOF-MS, where a mass analysis of the ions are achieved.

The RF voltage applied to the ring electrode 11 just before ions are ejected from the ion trapping space 14 differs depending on the mass to charge ratio of the ejected ions and the processings that the ions have undergone in the ion trap device 1. For example, as shown in FIG. 5, when the RF voltage is stopped using a high-speed switch at $t_c$, the actual voltage of the ring electrode 11 (which will be referred to as "the ring voltage") does not instantaneously become that of the end cap electrodes 12, 13 (which will be referred to as "the end cap voltage", and is zero in the case of FIG. 5), but gradually approaches it with an oscillation (which is called a "ringing"), because an RF resonance coil and an RF resonance capacitor are connected to the ring electrode 11. That is, a certain period of time is necessary until the ring voltage subsides to the end cap voltage.

If, before the ring voltage subsides to the end cap voltage, an ion ejecting voltage is applied to the end cap electrodes 12, 13 to eject ions from the ion trap device 1 to the TOF-MS 3, the ion ejection electric field in the ion trap device 1 has a variation from the calculated target field, and there arises an error in the initial kinetic energy of the ejected ions. Since the amplitude of the ringing depends on the amplitude of the RF voltage before the stop, variation in the ejection electric field when ions are ejected, a certain period after the stop time $t_c$, also changes with it.

If the error in the initial kinetic energy is small, the width of the peak changes little in the mass spectrum, and it does not affect the resolution in the mass to charge ratio. But the error in the kinetic energy affects the flight time of the ions, which results in a shift in the peak in the mass spectrum and makes it difficult to accurately determine the mass to charge ratio of the ions.

On the other hand, if enough time is allotted from the stop time $t_c$ to the ion ejecting time (i.e., enough time is taken until the ringing subsides), the ring voltage stabilizes and the above problem does not arise. In this case, however, the state where no quadrupole electric field exists in the ion trapping space lasts longer, so that ions may disperse before the ion ejection electric field is formed. This decreases the number of ions to be used in the analysis, and deteriorates the sensitivity of the analysis.

An object of the present invention is therefore to provide a mass analyzer and a mass analyzing method in which the shift of a peak or peaks in a mass spectrum is minimized while maintaining a high analyzing sensitivity, and the mass to charge ratio can be determined at high accuracy.

In the first aspect of the present invention, a mass analyzer comprises:

an ion trap device including an ion trapping space surrounded by a plurality of electrodes;

a time-of-flight mass analyzer for determining a mass to charge ratio of ions ejected from the ion trapping space;

a trapping voltage generator for generating an ion trapping RF voltage to at least one of the plurality of electrodes;

an ejecting voltage generator for generating an ejecting voltage to at least one of the plurality of electrodes to form an ion ejection electric field for ejecting ions trapped in the ion trapping space; and a controller for stopping the ion trapping RF voltage at a timing when ions are trapped in the ion trapping space and the ion trapping RF voltage is at a predetermined phase, and for applying the ion ejecting voltage a predetermined period after the ion trapping RF voltage is stopped.

In the second aspect of the present invention, a mass analyzing method comprises the steps of:

trapping ions in an ion trapping space surrounded by a plurality of electrodes by applying an ion trapping RF voltage to at least one of the plurality of electrodes;

stopping the ion trapping RF voltage at a timing when ions are trapped in the ion trapping space and the ion trapping RF voltage is at a predetermined phase; and applying an ion ejecting voltage to at least one of the plurality of electrodes for forming an ion ejection electric field to eject ions trapped in the ion trapping space to a time-of-flight mass analyzer a predetermined period after the ion trapping RF voltage is stopped.

In the present invention, in both aspects, the phase and the timing are predetermined under the condition that the voltage of the electrode or electrodes to which the ion trapping RF voltage was applied becomes almost the same the predetermined period after the ion trapping RF voltage is stopped at the predetermined phase, irrespective of the amplitude of the ion trapping RF voltage when it is stopped.

In the present invention, in both aspects, the electrode to which the ion trapping RF voltage is applied is normally the ring electrode, and the electrode to which the ion ejecting voltage is applied is normally the end cap electrodes. Other voltage configuration is of course possible in the present invention.

In the present invention, the ion ejection electric field is formed at the timing when the voltage of the ring electrode is the same as that of the end cap electrodes while the voltage of the ring electrode is still ringing after the ion trapping RF voltage is stopped. Since the frequency of the ringing is low, the voltage of the end cap electrodes can be regarded as constant while the ions are being ejected. Thus the kinetic energy of the ions ejected from the ion trapping space to the TOF-MS does not vary, and the flight time of the ions in the TOF-MS does not vary, either. This brings the peak of the ions to the same place in the mass spectrum, and makes it possible to determine the mass to charge ratio of the ions precisely.

If the amplitude of the ion trapping RF voltage before it is stopped is changed according to the mass to charge ratio of the ions to be analyzed, the amplitude of the ringing after the stop of the RF voltage also changes. The inventor of the present invention has found out that, if the ion trapping RF voltage is stopped at a certain phase, the voltage of the ring electrode becomes the same as the voltage of the end cap electrodes or, at least, becomes a certain fixed voltage after a certain time period irrespective of the amplitude of the ringing. The phase and the time period depend on the electric parameters of the electric circuit around the ion trap including the ion trap itself and its power source, but they are determined if the constitution of the device is fixed. Thus the phase and the time period can be experimentally determined beforehand, and the controller can use the values to stop the ion trapping RF voltage and to start applying the ion ejecting voltage.

In the present invention, by precisely controlling the stopping time of the the ion trapping RF voltage to come to a predetermined phase of the RF voltage, the voltage of the ring electrode can be adjusted to be the same as that of the end cap electrodes a certain time period after the ion trapping RF voltage is stopped, irrespective of the amplitude of the ion trapping RF voltage when it is stopped. Thus, by applying the ion ejecting voltage at such a timing, the initial kinetic energy of the ejected ions does not vary, and a precise determination of the mass to charge ratio of the ions becomes possible.

Even if the voltage of the ring electrode cannot be brought to be the same as that of the end cap electrodes, it suffices if the voltage of the ring electrode can be brought to a certain predetermined value, because the same ion ejection electric field can be formed by adjusting the ejecting voltage of the end cap electrodes by the difference between the predetermined value and the end cap voltage. In this case also a precise determination of the mass to charge ratio of the ions becomes possible.

DETAILED DESCRIPTION OF A PREFERRED EMBODIMENT

Figure 1:
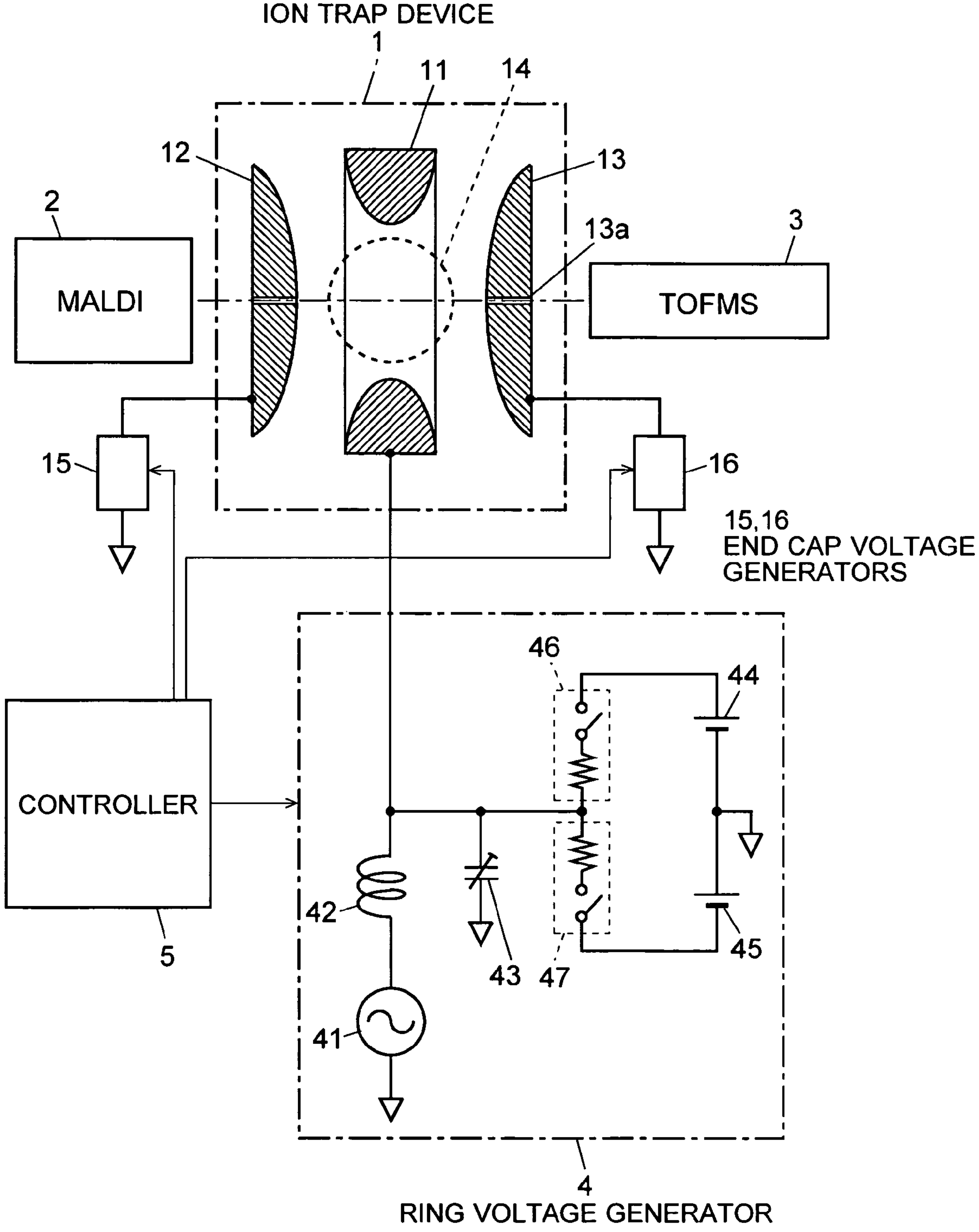
FIG. 1 schematically shows a mass analyzer of the invention.
Figure 4:
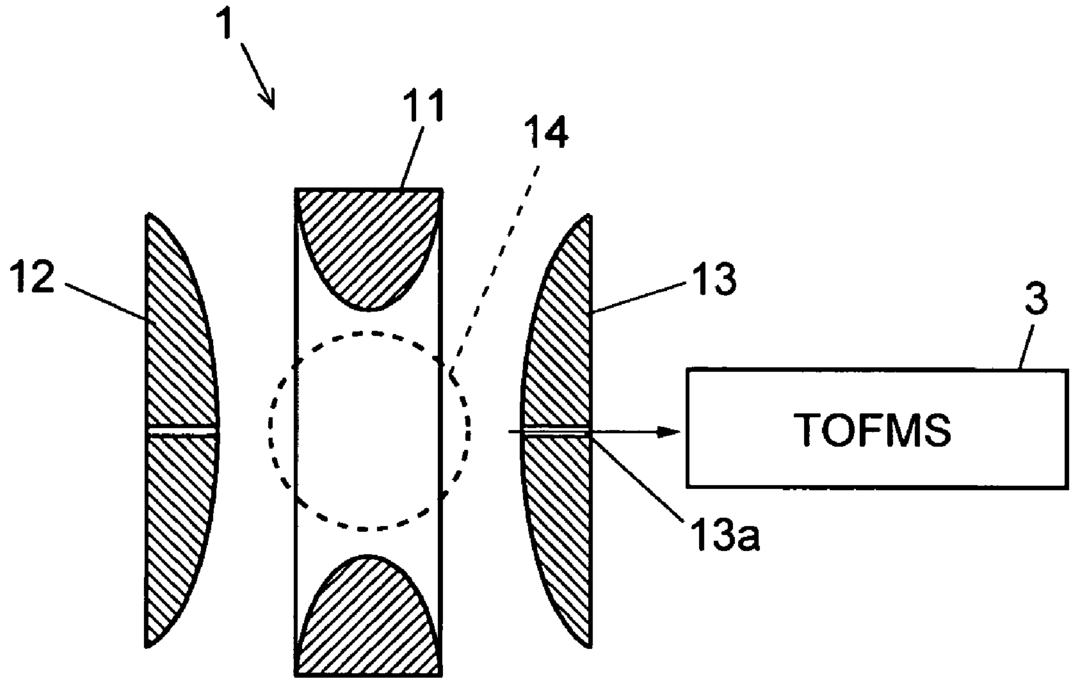
FIG. 4 shows a typical ion trap device.
Figure 5:
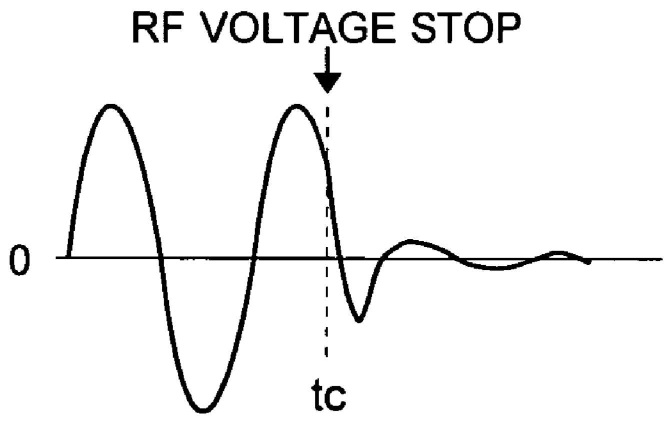
FIG. 5 shows a voltage of the ring electrode when RF voltage is stopped using a high-speed switch.

FIG. 1 schematically shows a mass analyzer embodying the present invention, where the same or similar elements as those in FIG. 4 are assigned the same numerals. The ion trap device 1 is composed of a ring electrode 11 and a pair of end cap electrodes 12, 13 opposing each other with the ring electrode 11 therebetween. An RF voltage is applied to the ring electrode 11, which forms a quadrupole electric field in the ion trapping space 14 surrounded by the electrodes 11, 12, 13. Ions are trapped in the ion trapping space 14 by the quadrupole electric field. End cap voltage generators 15, 16 are connected respectively to the end cap electrodes 12, 13 to apply appropriate voltages to them at every analyzing stage.

When ions generated in a Matrix-Assisted Laser Desorption/Ionization (MALDI) ion source 2 are introduced in the ion trap device 1, for example, voltages are applied to the end cap electrodes 12, 13 to decrease the kinetic energy of the ions. When a mass analysis is to be conducted in a TOF-MS 3, other voltages are applied to the end cap electrodes 12, 13 to accelerate the ions being ejected from the ion trapping space 14. When ions are selected or dissociated in the ion trapping space 14, still other voltages are applied to superimpose a selection electric field or a dissociation electric field, in addition to the ion trapping quadrupole electric field formed by the ion trapping RF voltage.

A coil 42 is connected to the ring electrode 11 as a part of a ring voltage generator 4 for applying an RF voltage to the ring electrode 11. The coil 42, the ring electrode 11 and the capacitance formed between the ring electrode 11 and the end cap electrodes 12, 13 constitute an LC resonant circuit. To be precise, in addition to the capacitance between the ring electrode 11 and the end cap electrodes 12, 13, the capacitance formed by a monitor circuit (not shown) for monitoring the RF voltage, a tuning circuit 43, high voltage switches 46, 47 and the wires connecting them, and the inductance of the coil 42 determines the resonance frequency.

There are several ways to drive the resonant circuit, such as one using a transformer. In the present embodiment, an end of the coil is driven directly by an RF driver 41. The frequency of the driving voltage generated by the RF driver 41 is fixed at 500 kHz, and the resonance frequency of the LC resonant circuit is adjusted to about 500 kHz by tuning the tuning circuit 43. The resonance occurring in the thus adjusted resonant circuit amplifies the drive voltage from the RF driver 41 and generates an ion trapping RF voltage on the ring electrode 11. In the present embodiment, a vacuum variable capacitor is used as the tuning circuit 43, where the tuning is achieved by adjusting the capacitance of the vacuum variable capacitor. Another example of the tuning circuit 43 is constituted by a coil 42 and a ferrite core inserted in the coil 42, where the inductance is changed by the position of the ferrite core in the coil 42.

To the ring electrode 11 are connected high voltage DC sources 44, 45 via high voltage switches 46, 47 respectively. They are used to quickly start the ion trapping RF voltage when ions are introduced into the ion trapping space 14, and to quickly suppress the ion trapping RF voltage when ions are ejected. For example, when a negative high voltage is to be erected for starting the RF oscillation, the following steps are taken.

First, the high voltage switch 47 connected to the negative high voltage DC source 45 is closed, so that the voltage of the ring electrode 11 becomes the same as that of the negative high voltage DC source 45. Just after that, when the high voltage switch 47 is opened, the resonant circuit begins to oscillate resonantly at the resonance frequency. When the resonant oscillation is to be stopped, the high voltage switches 46 and 47 are both closed and, at the same time, the output of the RF driver 41 is reduced to zero. Since the absolute values of the voltages of the positive and negative high voltage DC sources 44 and 45 are the same, and the internal resistance of the high voltage switches 46 and 47 are the same, the RF voltage becomes zero. After all the ions are ejected from the ion trapping space 14, both high voltage switches 46 and 47 are opened.

The controller 5 controls the ring voltage generator 4 and the end cap voltage generators 15, 16 to perform the above analyzing actions. One of the features of the present invention is the control method of the ring voltage generator 4 and the end cap voltage generators 15, 16.

The method is detailed as follows. When ions of a target mass to charge ratio are to be trapped in the ion trapping space 14, an ion trapping RF voltage having the frequency as explained above is applied to the ring electrode 11 from the ring voltage generator 4, and a quadrupole electric field is formed in the ion trapping space 14. When the ions thus trapped are to be ejected from the ion trapping space 14 to the TOF-MS 3, first, the both high voltage switches 46, 47 are closed to stop the ion trapping RF voltage. Then, in order to form an ion ejection electric field in the ion trapping space 14, appropriate voltages are applied from the end cap voltage generators 15, 16 to the end cap electrodes 12, 13. The applying timing of the end cap voltages was conventionally set at the timing, for example, so that the ringing of the ring voltage becomes minimum, i.e., when the RF voltage is at its peak and the magnetic energy stored in the coil 42 is zero.

Figure 2:
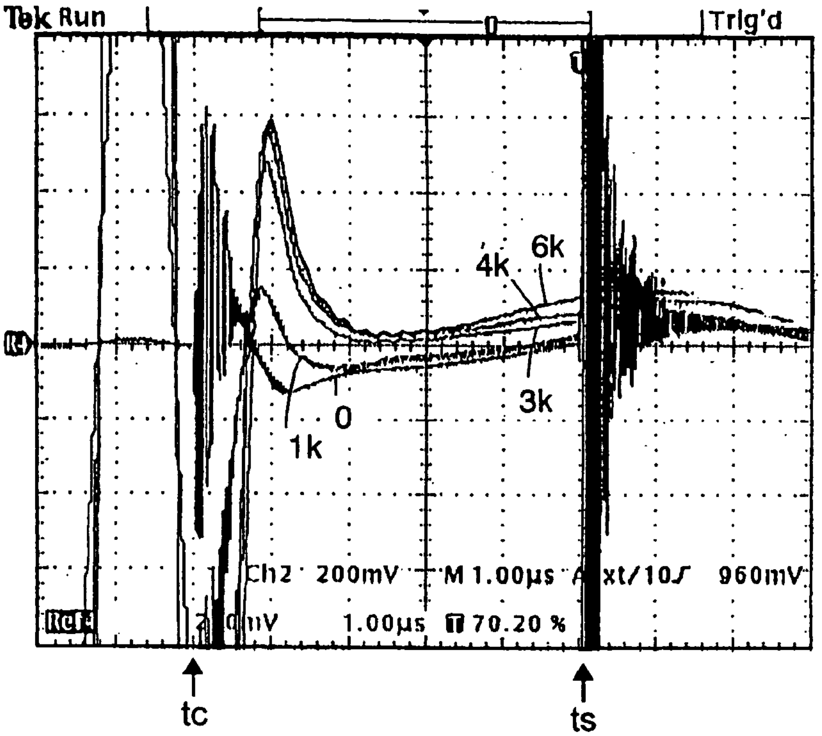
FIG. 2 shows an example waveform of the ring voltage in a conventional method.

FIG. 2 shows an example waveform of the ring voltage in a conventional method, in which the amplitude of the RF voltage before it is stopped is 0 kV, 1 kV, 3 kV, 4 kV and 6 kV. In FIG. 2, $t_c$ is the time when the RF voltage is stopped, so that, to the left of $t_c$, the RF voltage is still applied to the ring electrode 11. The amplitude of the RF voltage is much larger than the frame range. At $t_c$, the high voltage switches 46, 47 are both closed, and the ring voltage rapidly decreases. After that, a moderate oscillation (i.e., ringing) occurs, wherein the amplitude of the ringing differs depending on the amplitude of the RF voltage before it is stopped. Thus, on the mass spectrum obtained through a mass analysis in which ions are ejected at time $t_s$, the positions of the peaks shift according to the value of the ring voltage at the time of ion ejection $t_s$, as explained above. The noises appearing at $t_c$ and $t_s$ are caused by a large current generated when the high voltage switches are operated at the time of RF voltage stop and at the time of ion ejection, respectively.

Figure 3:
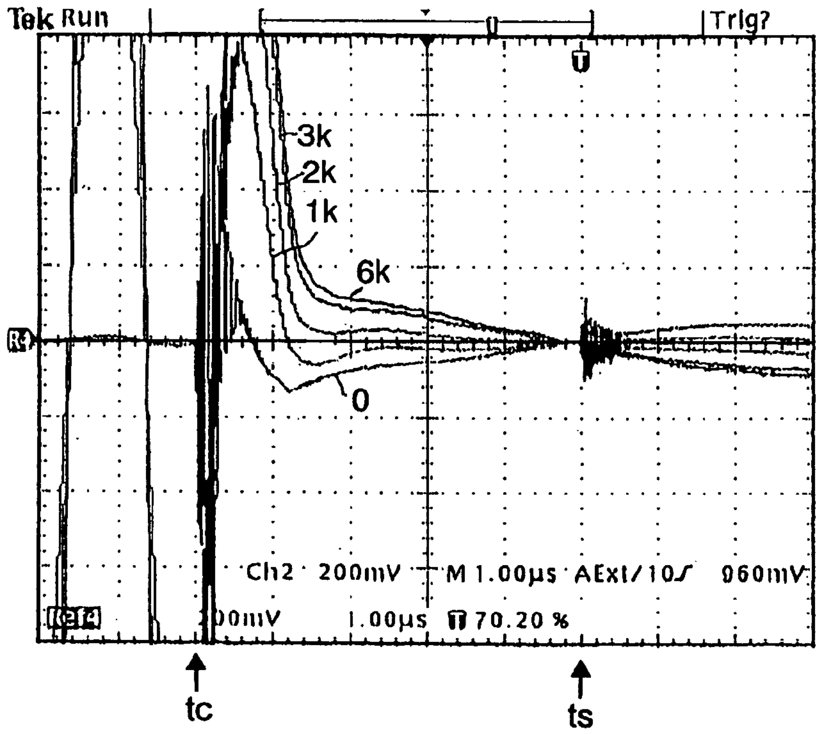
FIG. 3 shows an example waveform of the ring voltage set at a certain phase of the RF voltage.

When, on the other hand, the closing timing $t_c$ of the high voltage switches 46, 47 (for stopping the RF voltage to the ring electrode 11) is set at a certain phase of the RF voltage, the waveform of the ring voltage is as shown in FIG. 3, wherein, as in FIG. 2, the waveforms are at the amplitude of the RF voltage of 0 kV, 1 kV, 2 kV, 3 kV and 6V. As shown in FIG. 3, the ringing of the ring voltages just after the time $t_c$ is larger than that in FIG. 2. But in FIG. 3, the ring voltages converge to the same value at around the time $t_s$ irrespective of the amplitude of the RF voltage when it is stopped. This means that ions can be ejected from the ion trapping space 14 to the TOF-MS 3 at almost the same condition of the ejection electric field irrespective of the amplitude of the RF voltage when it is stopped if the ions are ejected at that timing. This avoids the above described problem that the initial kinetic energy of the ions varies and the mass peak shifts in the mass spectrum.

The conditions that should be determined here are (1) the phase of the RF voltage applied to the ring electrode when it is stopped and (2) the delay from the time when the RF voltage is stopped to the time when the ion ejecting voltage is applied to the end cap electrodes 12, 13. The delay depends on the capacitance between the electrodes 11, 12, 13, that in the high voltage switches 46, 47 and in the high voltage DC source 44, 45 and the resistance of the high voltage switches 46, 47. In the example of FIG. 3, the delay is about 5 μsec. An appropriate phase when the RF voltage is stopped also depends on those conditions. Anyway, those conditions are determined when the construction of the ion trap device is determined, so that the values of the phase and delay can be determined appropriately when a unit of the ion trap device is constructed and tuned before it is supplied in use.

Thus determined values are preset in the controller 5, and the control of the ion trap device is performed based on the values. The control enables adjusting the closing timing of the high voltage switches 46, 47 (for stopping the RF voltage applied to the ring electrode 11) to the appropriate phase of the RF voltage, and enables ejecting ions when the ring voltage is at a certain fixed value irrespective of the amplitude of the RF voltage when it is stopped. If the two conditions change when the ion trap device is used, an appropriate program may be installed in the control computer to automatically find and set up the optimal conditions when a user calibrates the mass spectrometer.

In the example of FIG. 3, the ring voltage subsides at about zero which is the same as that of the end cap electrodes. However, the final value of the ring voltage can be other values. In that case, by accordingly changing the ion ejecting voltage applied to the end cap electrodes, and by accordingly tuning the TOF-MS 3, the same performance of the mass spectrometer can be obtained.

The above description of the embodiment of the present invention is only an example, and it is apparent that a person skilled in the art can modify it within the scope of the present invention.

What is claimed is:

1. A mass analyzer comprising:

an ion trap device including an ion trapping space surrounded by a plurality of electrodes;

a time-of-flight mass analyzer for determining a mass to charge ratio of ions ejected from the ion trapping space;

a trapping voltage generator for generating an ion trapping RF voltage to at least one of the plurality of electrodes;

an ejecting voltage generator for generating an ejecting voltage to at least one of the plurality of electrodes to form an ion ejection electric field for ejecting ions trapped in the ion trapping space; and a controller for stopping the ion trapping RF voltage at a timing when ions are trapped in the ion trapping space and the ion trapping RF voltage is at a predetermined phase, and for applying the ion ejecting voltage a predetermined period after the ion trapping RF voltage is stopped.

2. The mass analyzer according to claim 1, wherein the predetermined phase and the predetermined period are predetermined so that, when the ion trapping RF voltage is stopped at the predetermined phase and the predetermined period passes, the voltage of said at least one of the electrodes to which the ion trapping RF voltage is generated becomes almost a certain fixed value irrespective of the amplitude of the ion trapping RF voltage when it is stopped.

3. The mass analyzer according to claim 2, wherein the plurality of electrodes are composed of a ring electrode and a pair of end cap electrodes placed opposing each other with the ring electrode therebetween, the ion trapping RF voltage is generated to the ring electrode, and the ejecting voltage is generated to the end cap electrodes.

4. A mass analyzing method comprises the steps of:

trapping ions in an ion trapping space surrounded by a plurality of electrodes by applying an ion trapping RF voltage to at least one of the plurality of electrodes;

stopping the ion trapping RF voltage at a timing when ions are trapped in the ion trapping space and the ion trapping RF voltage is at a predetermined phase; and applying an ion ejecting voltage to at least one of the plurality of electrodes for forming an ion ejection electric field to eject ions trapped in the ion trapping space to a time-of-flight mass analyzer a predetermined period after the ion trapping RF voltage is stopped.

5. The mass analyzing method according to claim 4, wherein the predetermined phase and the predetermined period are predetermined so that, when the ion trapping RF voltage is stopped at the predetermined phase and the predetermined period passes, the voltage of said at least one of the electrodes to which the ion trapping RF voltage is applied becomes almost a certain fixed value irrespective of the amplitude of the ion trapping RF voltage when it is stopped.

6. The mass analyzing method according to claim 4, wherein the predetermined phase and the predetermined period are predetermined so that, when the ion trapping RF voltage is stopped at the predetermined phase and the predetermined period passes, the voltage of said at least one of the electrodes to which the ion trapping RF voltage is applied becomes zero irrespective of the amplitude of the ion trapping RF voltage when it is stopped.

7. The mass analyzing method according to claim 4, wherein the plurality of electrodes are composed of a ring electrode and a pair of end cap electrodes placed opposing each other with the ring electrode therebetween, the ion trapping RF voltage is applied to the ring electrode, and the ejecting voltage is applied to the end cap electrodes.

8. An ion trap device comprising:

a plurality of electrodes surrounding an ion trapping space;

a trapping voltage generator for generating an ion trapping RF voltage to at least one of the plurality of electrodes;

an ejecting voltage generator for generating an ejecting voltage to at least one of the plurality of electrodes to form an ion ejection electric field for ejecting ions trapped in the ion trapping space; and a controller for stopping the ion trapping RF voltage at a timing when ions are trapped in the ion trapping space and the ion trapping RF voltage is at a predetermined phase, and for applying the ion ejecting voltage a predetermined period after the ion trapping RF voltage is stopped.

9. The ion trap device according to claim 8, wherein the predetermined phase and the predetermined period are predetermined so that, when the ion trapping RF voltage is stopped at the predetermined phase and the predetermined period passes, the voltage of said at least one of the electrodes to which the ion trapping RF voltage is generated becomes almost a certain fixed value irrespective of the amplitude of the ion trapping RF voltage when it is stopped.

10. The ion trap device according to claim 9, wherein the plurality of electrodes are composed of a ring electrode and a pair of end cap electrodes placed opposing each other with the ring electrode therebetween, the ion trapping RF voltage is generated to the ring electrode, and the ejecting voltage is generated to the end cap electrodes.

* * * * *